United States Patent [19]

DeNicola, Jr. et al.

[11] Patent Number: 5,585,434
[45] Date of Patent: Dec. 17, 1996

[54] BLENDS OF POLYOLEFIN GRAFT COPOLYMERS AND POLYCARBONATE

[75] Inventors: Anthony J. DeNicola, Jr., New Castle County; Kyle D. Eastenson, Newark; Tam T. M. Phan, Bear, all of Del.

[73] Assignee: Montell North America Inc., Wilmington, Del.

[21] Appl. No.: 455,607

[22] Filed: May 31, 1995

[51] Int. Cl.$^6$ .............................. C08L 51/06; C08L 53/02
[52] U.S. Cl. ........................ 525/67; 525/92 E; 525/92 F
[58] Field of Search ...................... 525/67, 92 E, 525/92 F

[56] References Cited

U.S. PATENT DOCUMENTS

| | | | |
|---|---|---|---|
| 4,119,607 | 10/1978 | Gergen et al. | 523/522 |
| 4,897,448 | 1/1990 | Romance | 525/67 |
| 5,034,457 | 7/1991 | Serini et al. | 525/67 |
| 5,140,074 | 8/1992 | DeNicola | 525/263 |
| 5,262,476 | 11/1993 | Laughner | 525/67 |
| 5,314,949 | 5/1994 | Kozakura | 525/67 |
| 5,411,994 | 5/1995 | Galli | 521/50.5 |
| 5,424,361 | 6/1995 | DeRudder | 525/67 |

FOREIGN PATENT DOCUMENTS

| | | |
|---|---|---|
| 8430258 | 1/1985 | Australia . |
| 705481 | 3/1965 | Canada . |
| 272857 | 6/1988 | European Pat. Off. . |
| 63-215752 | 9/1988 | Japan . |
| 982752 | 2/1965 | United Kingdom . |

*Primary Examiner*—Vasu S. Jagannathan

[57] ABSTRACT

Disclosed is a composition comprising, by weight, (a) about 94% to about 30% of a graft copolymer comprising a backbone of a propylene polymer material having graft polymerized thereto monomers that form grafted copolymers or terpolymers, the monomers being selected from the group consisting of (i) styrene and acrylonitrile, and (ii) styrene and maleic anhydride, or alpha-methylstyrene, styrene and maleic anhydride, wherein the grafted copolymers or terpolymers formed from (i) or (ii) are present in an amount of about 10 to about 95 pph of propylene polymer material, (b) about 5% to about 40% of at least one aromatic polycarbonate, and (c) about 1% to about 15% of at least one aliphatic polyester. The composition optionally also comprises about 5% to about 20% of one or more rubber components, about 1% to about 50% of a propylene polymer material, or both.

22 Claims, No Drawings

BLENDS OF POLYOLEFIN GRAFT COPOLYMERS AND POLYCARBONATE

FIELD OF THE INVENTION

This invention relates to compositions comprising graft copolymers of a propylene polymer material, a polycarbonate, an aliphatic polyester, and optionally, either a rubber component or a propylene polymer material, or both.

BACKGROUND OF THE INVENTION

Blends of polyolefins and polycarbonates, especially bisphenol-A polycarbonate, have been studied in the past because of the improved properties of the blend compared to the properties of either polymer alone. The polyolefin contributes excellent chemical resistance, better flowability and low cost. The polycarbonate contributes high hardness, high heat distortion temperature, and high impact strength. For example, United Kingdom Patent 982,752 discloses a blend comprising 80%–99% by weight of polyethylene and 1%–20% of a thermoplastic aromatic polycarbonate. U.S. Pat. No. 4,119,607 discloses a mixture of 40 parts by weight of an alkenyl arene-diene block copolymer, 5–48 parts of at least one dissimilar engineering thermoplastic such as a polyolefin, a polycarbonate or nitrile barrier resin, and a saturated thermoplastic polyester. Canadian Patent 705,481 discloses a blend of 80%–99.5% by weight of crystallizable polypropylene of molecular weight greater than about 10,000 and 0.5%–20% thermoplastic polyaryl carbonate polymer. U.S. Pat. No. 5,034,457 discloses a thermoplastic blend of 1%–99% by weight of an aromatic polycarbonate, 0%–99% of an amorphous thermoplastic such as a polycarbonate/polysiloxane block copolymer, 0%–99% of at least one rubber such as a thermoplastic olefin elastomer, 0%–99% of a partly crystalline thermoplastic such as a polyolefin, 2 and 0%–99% of at least one graft copolymer comprising a rubber and a graft copolymerized monomer.

However, in general, blending of polymers has not been a successful route for combining the desirable individual characteristics of two or more polymers into a single material. Polypropylene, for example, and polycarbonate are incompatible materials that phase separate and delaminate when blended together.

A method is needed for improving the compatibility of polyolefin materials and polycarbonates in order to take advantage of the improved properties provided by a blend of the two materials. It would also desirable to improve the toughness of such a polymer blend.

SUMMARY OF THE INVENTION

The composition of this invention comprises, by weight, (a) about 94% to about 30% of a graft copolymer comprising a backbone of a propylene polymer material having graft polymerized thereto monomers that form grafted copolymers or terpolymers, the monomers being selected from the group consisting of (i) styrene and acrylonitrile, wherein the amount of acrylonitrile is about 15% to about 35%, based on the total weight of monomers, and (ii) styrene and maleic anhydride, or alpha-methylstyrene, styrene, and maleic anhydride, wherein alpha-methylstyrene comprises 0% to about 45%, styrene comprises about 10% to about 60%, and maleic anhydride comprises about 5% to about 45%, based on the total weight of monomers, and the grafted copolymers or terpolymers formed from the monomers (i) or (ii) are present in an amount of about 10 to about 95 parts per hundred parts of propylene polymer material, (b) about 5% to about 40 % of at least one aromatic polycarbonate, and (c) about 1% to about 15% of at least one aliphatic polyester having recurring ester structural units of the formula

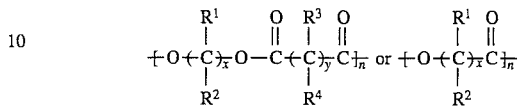

where $R^1$, $R^2$, $R^3$, and $R^4$ are each H, $CH_3$, or a linear or branched alkyl group and x and y are each 1–20 or higher, and (a)+(b)+(c)=100%. The composition optionally also comprises about 5% to about 20% of one or more rubber components, about 1% to about 50% of a propylene polymer material, or both.

The compositions of this invention exhibit excellent retention of heat resistance, high stiffness and tensile strength at elevated temperatures, high chemical resistance, good gloss and surface appearance, melt processibility and high impact strength as well as improved compatibility.

DETAILED DESCRIPTION OF THE INVENTION

The amount of graft copolymer, component (a), in the composition of this invention is about 94% to about 30% by weight, based on the total amount of the composition. The propylene polymer backbone of component (a) can be (i) a homopolymer of propylene; (ii) a random copolymer of propylene and an olefin selected from the group consisting of ethylene and $C_4$–$C_{10}$-olefins, provided that, when the olefin is ethylene, the maximum polymerized ethylene content is about 10%, preferably about 4%, percent by weight, and when the olefin is a $C_4$–$C_{10}$ olefin, the maximum polymerized content thereof is about 20%, preferably about 16%, by weight; and (iii) a random terpolymer of propylene and an olefin selected from the group consisting of ethylene and $C_4$–$C_8$ 1-olefins, provided that the maximum polymerized $C_4$–$C_8$ 1-olefin content is about 20%, preferably about 16%, by weight, and, when ethylene is one of the olefins, the maximum polymerized ethylene content is about 5%, preferably about 4%, by weight. Propylene homopolymer is the preferred propylene polymer backbone material.

The monomers grafted onto the backbone of propylene polymer material are either (i) styrene and acrylonitrile, or (ii) styrene and maleic anhydride, or alpha-methylstyrene, styrene, and maleic anhydride. During the graft polymerization, the monomers also copolymerize to form a certain amount of free or ungrafted copolymer or terpolymer. The polymerized monomers are designated as (i) PSAN, or (ii) P(MS/S/MA) or PSMA and comprise from about 10 to about 95 parts per hundred parts of the propylene polymer material, preferably about 30 to about 70 pph. The morphology of the graft copolymer is such that the propylene polymer material is the continuous or matrix phase, and the PSAN, P(MS/S/MA), or PSMA, both grafted and ungrafted, are a dispersed phase.

In the case of PSAN, the acrylonitrile comprises about 15% to about 35% of the total weight of the two monomers, preferably about 15% to about 30%, and most preferably about 20% to about 30%. In the case of PSMA or P(MS/S/MA), the alpha-methylstyrene comprises from 0% to about 45%, the styrene comprises about 10% to about 60%, and the maleic anhydride comprises about 5% to about 45%, based on the total weight of monomers. When alpha-methylstyrene is used as a monomer, it is present in an amount of about 1% to about 45%, based on the total weight of monomers. The weight average molecular weight ($M_w$) of the free PSAN, P(MS/S/MA), or PSMA is about 50,000 to about 900,000. When the $M_w$ of the PSAN, P(MS/S/MA), or PSMA is used, it refers to the $M_w$ of the ungrafted copolymer or terpolymer, excluding the grafted monomers, which cannot be analyzed accurately by gel permeation chromatography. It does not refer to the $M_w$ of the matrix.

The graft copolymer that forms the principal component of the present composition can be made according to any one of various methods. One of these methods involves forming active grafting sites on the propylene polymer material either in the presence of the grafting monomers, or followed by treatment with the monomers. The grafting sites can be produced by treatment with a peroxide or other chemical compound that is a free radical polymerization initiator, or by irradiation with high energy ionizing radiation. The free radicals produced in the polymer as a result of the chemical or irradiation treatment form the active grafting sites on the polymer and initiate the polymerization of the monomers at these sites. Graft copolymers produced by peroxide-initiated grafting methods are preferred.

In a peroxide-initiated method, the propylene polymer material is treated at a temperature of about 60° to about 125° C., preferably about 80° to about 120° C., with about 0.1 to about 6, preferably about 0.2 to about 3.0, pph (pans by weight per 100 parts by weight of the propylene polymer material) of an initiator having a decomposition half-life of about 1 to about 240, preferably about 5 to about 100, and more preferably about 10 to about 40, minutes at the temperature employed. Organic peroxides, and especially those that generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethylcyclohexane, 2,5-dimethyl-2,5-di-tert-butylperoxyhexane, and bis(alpha-tert-butylperoxyisopropylbenzene); peroxy esters, such as tert-butylperoxy pivalate, tert-butyl perbenzoate, 2,5-dimethylhexyl-2,5-di(perbenzoate), tert-butyl di(perphthalate), tert-butylperoxy-2-ethylhexanoate; and 1,1-dimethyl-3-hydroxybutylperoxy-2-ethyl hexanoate; and peroxy carbonates, such as di(2-ethylhexyl)peroxy dicarbonate, di(n-propyl)peroxy dicarbonate, and di(4-tert-butylcyclohexyl)peroxy dicarbonate.

Over a period that coincides with, or follows, the period of initiator treatment, with or without overlap, the propylene polymer material is treated with about 10% to about 50% by weight of the grafting monomers, based on the total weight of propylene polymer material and grafting monomers used, at a rate of addition that does not exceed about 4.5, preferably about 3.0, and more preferably about 2.0, pph per minute at any monomer addition level. If the monomers are added after the initiator addition period, preferably no more than about 2.5 initiator half-lives separate the initiator and monomer addition periods.

After the grafting period, any unreacted monomers are removed from the resultant grafted propylene polymer material, and any unreacted initiator is decomposed and any residual free radicals are deactivated, preferably by heating, generally at a temperature of at least 110° C. for at least 5 minutes, preferably at least 120° C. for at least 20 minutes. A substantially nonoxidizing environment is maintained throughout the process.

The expression "substantially nonoxidizing", when used herein to describe the environment or atmosphere to which the irradiated olefin polymer material is exposed before the deactivation of residual free radicals, means an environment in which the active are generally prepared by reacting a dihydric phenol with a carbonate precursor such as, for example, phosgene. Suitable processes for preparing the polycarbonates of the present invention are described in, for example, U.S. Pat. No. 4,123,436 and 3,153,008. However, other known processes for producing polycarbonates are suitable. Particularly preferred polycarbonates are aromatic polycarbonates prepared by reacting bisphenol-A [2,2-bis(4-hydroxyphenyl)propane] with phosgene. The melt flow rate of the polycarbonate is typically about 1 to about 50 dg/minute measured at 300° C. and 1.2 kg (ASTM D 1238).

One or more aliphatic polyesters are used to enhance to properties of the composition of this invention. These polyesters have recurring ester structural units of the formula:

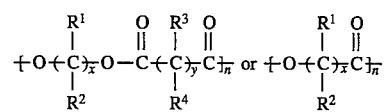

where $R^1$, $R^2$, $R^3$, and $R^4$ are each H, $CH_3$, or a linear or branched alkyl group and x and y are each 1–20 or higher. These polyesters typically have a $M_w$ of about 5,000 to about 300,000. Suitable polyesters include, for example, polycaprolactone, polybutylene adipate, polyethylene succinate, poly(2,2-dimethyl-1,3-propylene)succinate, poly(neopentyl glycol sebacate), and a block copolymer of a polyurethane and polycaprolactone or polyethylene adipate. Polycaprolactone is the preferred polyester. The amount of polyester present in the composition is about 1% to about 15%, preferably about 2% to about 7%, by weight. If none of the optional components of the composition is present, the amounts of (a)+(b)+(c)=100%.

The polyurethane block copolymer is a thermoplastic polyurethane elastomer made by the reaction of a polyisocyanate with a linear polyester or polyether containing hydroxyl groups. The isocyanate portion is commonly referred to as the "hard segment" or crystallizable segment, and the polyol as the "soft segment" or elastomeric segment. Suitable polyurethane block copolymers are commercially available under the trade names Texin (Mobay Chemical Co.), Estane (BF Goodrich Co.), Roylar (Uniroyal Inc.) and oxygen concentration, i.e., the concentration of oxygen in a form that will react with the free radicals in the irradiated material, is less than about 15%, preferably less than about 5%, and more preferably less than about 1%, by volume. The most preferred concentration of active oxygen is 0.004% or lower by volume. Within these limits, the nonoxidizing atmosphere can be any gas, or mixture of gases, that is oxidatively inert toward the free radicals in the olefin polymer material, e.g., nitrogen, argon, helium, and carbon dioxide.

In a method wherein the active grafting sites are produced by irradiation, the propylene polymer material is irradiated at a temperature in the range of about 10° C. to about 85° C. with high energy ionizing radiation, and the irradiated polymer material is treated at a temperature of about 10° C. to about 100° C., preferably about 10° C. to about 70° C., and more preferably about 10° C. to about 50° C., for at least about 3 minutes, preferably at least about 10 minutes in a semi-batch process, with about 10% to about 70% by weight of the grafting monomers, based on the total weight of propylene polymer material and grafting monomers used.

Thereafter, simultaneously or successively in optional order, substantially all residual free radicals in the resultant grafted propylene polymer material are deactivated, and any unreacted monomers are removed from the material. The propylene polymer material is maintained in a substantially nonoxidizing environment, e.g., under an inert gas, throughout the process at least until after the deactivation of residual free radicals has been completed. The deactivation of free radicals preferably is accomplished by heating, e.g., at temperatures of at least 100° C., preferably at least 120° C., generally for at least 20 minutes.

The polycarbonate, component (b) of the composition of this invention, is present in an amount of about 5% to about 40% by weight, preferably about 10% to about 30%, and more preferably about 20% to about 30%. One or more aromatic polycarbonates can be used. The aromatic polycarbonates that are suitable for use in the present invention are well known in the art and are commercially available. These polycarbonates can be prepared by a variety of conventional and well known processes, which include transesterification, melt polymerization, and interfacial polymerization. The polycarbonates Pellethane (Upjohn Co.). For example, a polyurethane block copolymer made from polycaprolactone and a diisocyanate has the formula:

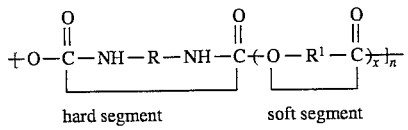

and a polyurethane block copolymer made from poly(ethylene adipate) and a diisocyanate has the formula:

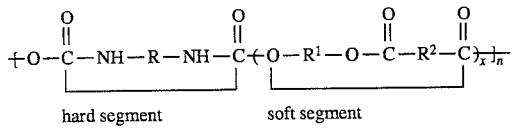

where R is a linear or branched alkyl group or an aromatic group, and $R^1$ and $R^2$ are linear or branched alkyl groups.

The composition of this invention can also optionally comprise component (d), a rubber component. The rubber component is selected from one or more of the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. Monoalkenyl aromatic hydrocarbon-conjugated diene block copolymers are the preferred rubber component. When present, the rubber component is used in an amount of about 5% to about 20%, preferably about 5% to about 15%, by weight, and (a)+(b)+(c)+(d)=100%.

Suitable polyolefin rubbers include, for example, saturated polyolefin rubbers such as ethylene/propylene monomer rubbers (EPM) and unsaturated polyolefin rubbers such as ethylene/propylene/diene monomer rubbers (EPDM). The preferred polyolefin rubber is an ethylene/propylene monomer rubber typically having an ethylene/propylene weight percent ratio in the range of about 25/75 to about 75/25, preferably about 40/60 to about 60/40, and an intrinsic viscosity in the range of about 2.0 to about 6.0, preferably about 2.5 to about 4.0 dl/g. One suitable polyolefin rubber is EPM 306P random ethylene/propylene copolymer, available from Polysar.

The monoalkenyl aromatic hydrocarbon-conjugated diene block copolymer can be a thermoplastic elastomer of the A-B (or diblock) structure, the linear A-B-A (or triblock) structure, the radial (A-B)n type where n=3%–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and ratio of monoalkenyl aromatic hydrocarbon to rubber. The block copolymer can also be hydrogenated. Typical monoalkenyl aromatic hydrocarbon monomers are styrene, ring-substituted $C_1$–$C_4$ linear or branched alkyl styrenes, and vinyltoluene. Styrene is preferred. Suitable conjugated dienes are butadiene and isoprene.

The weight average molecular weight $M_w$ of the block copolymers generally will be in the range of about 45,000 to about 260,000 g/mole, average molecular weights in the range of about 50,000 to about 125,000 g/mole being preferred on the basis that they afford blend compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60. One suitable block copolymer is Septon 2007, available from Marubeni Specialty Chemicals, Inc. This block copolymer is a hydrogenated triblock copolymer having a melt flow rate of 4 to 100 dg/min and comprising ~30% styrene end blocks and ~70% isoprene rubbery midblock.

The core-shell rubber components comprise small particles of crosslinked rubber phase surrounded by a compatibilizing shell, normally a glassy polymer or copolymer. The core is typically a diene rubber such as butadiene or isoprene, or an acrylate. The shell is typically a polymer of two or more monomers selected from styrene, methyl methacrylate, and acrylonitrile. Particularly preferred core-shell rubbers have an acrylate core.

Another optional ingredient in the composition of this invention is (e), a propylene polymer material. When present, it is used in an amount of about 1% to about 50% by weight. If the propylene polymer material is used, (a)+(b)+(c)+(d)+(e)=100%, or (a) (b)+(c)+(e)=100%. If this optional ingredient is present, the amount of the graff copolymer, component (a), can be reduced to as low as about 30%. The ungraffed propylene polymer material can be the same material as the propylene homopolymer used as the backbone of the graff copolymer or it can be different, i.e., it is selected from the group consisting of (i) a homopolymer of propylene; (ii) a random copolymer of propylene and an olefin selected from the group consisting of ethylene and $C_4$–$C_{10}$-olefins, provided that, when the olefin is ethylene, the maximum polymerized ethylene content is about 10%, preferably about 4%, by weight, and when the olefin is a $C_4$–$C_{10}$-olefin, the maximum polymerized content thereof is about 20%, preferably about 16%, by weight; (iii) a random terpolymer of propylene and an olefin selected from the group consisting of ethylene and $C_4$–$C_8$ 1-olefins, provided that the maximum polymerized $C_4$–$C_8$ 1-olefin content is about 20%, preferably about 16%, by weight, and, when ethylene is one of the olefins, the maximum polymerized ethylene content is about 5%, preferably about 4%, by weight; or (iv) a homopolymer or random copolymer of propylene that is impact-modified with an ethylene-propylene monomer rubber or an ethylene/propylene/butene monomer rubber, either in the reactor or by physical blending, the ethylene-propylene monomer rubber or the ethylene/propylene/butene monomer rubber content of the modified polymer being in the range of about 5% to about 70%, and the ethylene content of the rubber being in the range of about 7% to about 70%, and preferably about 10% to about 60%. The $C_4$–$C_{10}$ olefins include the linear and branched $C_4$–$C_{10}$-olefins such as, for example, 1-butene, 1-pentene, 3-methyl-1-butene, 4-methyl-1-pentene, 1-hexene, 3,4-dimethyl-1-butene, 1-heptene, and 3-methylhexene. The preferred propylene polymer material is a broad $M_w$ range propylene homopolymer.

The propylene polymer backbone of the grafted copolymer and the propylene polymer material per se, when present, form the continuous or matrix phase of the compositions of this invention. The other components of the compositions, including the PSAN, PSMA, or P(MS/S/MA) grafted onto the polypropylene backbone; free PSAN, PSMA, or P(MS/S/MA); the aromatic polycarbonate(s); the aliphatic polyester(s), and the rubber component(s) are homogeneously dispersed in the continuous phase.

In one preferred embodiment of the invention, the composition comprises by weight (a) about 94% to about 45% of a graft copolymer comprising a propylene polymer material having graft polymerized thereto monomers comprising styrene and acrylonitrile (about 20% to about 25% acrylonitrile, based on the total weight monomers), the polymerized monomers being present in an amount of about 50 pph to about 95 pph, (b) about 5% to about 40% bisphenol-A polycarbonate, (c) about 1% to about 15% polycaprolactone, (d) about 5% to about 20% acid- or anhydride-functionalized hydrogenated styrene block copolymer, and (a)+(b)+(c)+(d)=100%. If about 5% to about 40% propylene homopolymer is present, the amount of graft copolymer is about 30% to about 65% and the amount of polycarbonate is about 10% to about 30%, and (a)+(b)+(c)+(d)+(e)=100%.

In another preferred embodiment, the composition of this invention comprises by weight (a) about 94% to about 45% of a graft copolymer comprising a propylene polymer material having graft polymerized thereto monomers comprising about 40% alpha-methylstyrene, about 20% styrene, and about 40% maleic anhydride, based on the total weight of monomers, the polymerized monomers being present in an amount of about 50 pph to about 95 pph, (b) about 5% to about 40% bisphenol-A polycarbonate, (c) about 1% to about 15% polycaprolactone, and (d) about 5% to about 20% acid- or anhydride-functionalized hydrogenated styrene block copolymer, and (a)+(b)+(c)=(d)=100%. If about 5% to about 40% propylene homopolymer is present, the amount of graft copolymer is about 30% to about 65% and the amount of polycarbonate is about 10% to about 30%, and (a)+(b)+(c)+(d)+(e)=100%.

EXAMPLE 1

This example describes the effect of varying the amount of polyester on the physical properties of compositions that contained a graff copolymer, a polycarbonate, and a polyester. Comparisons were also made with the properties of compositions comprising the graff copolymer alone (Comparative Example 1), 70/30 graft copolymer/polycarbonate (Comparative Example 2), and graff copolymer plus polyester with no polycarbonate (Comparative Example 3).

The graff copolymer is a styrene/acrylonitrile copolymer grafted onto a propylene homopolymer backbone and is designated as PP-g-PSAN in the tables. In this and the following examples the propylene homopolymer used as the backbone polymer had the following properties: spherical form, melt flow rate (MFR) of 10 dg/min at 230° C. and 2160 g, 0.44 cc/g porosity, 96.5% insoluble in xylene at room temperature, $M_w/M_n$=5. The monomers (75/25 styrene/acrylonitrile) were graffed onto the polypropylene backbone at a grafting temperature of 100° C. using the previously described peroxide-initiated graff polymerization process. Fifty parts by weight monomers were added per 100 parts polypropylene. 11-Tert-butylperoxy pivalate (2.6 pph active peroxide, 75% in mineral spirits) was used as the peroxide initiator. The styrene and acrylonitrile were premixed and fed at 1.0 pph/min for 50 minutes, and peroxide was fed separately at 0.07 pph/min. A monomer to initiator (M/I) ratio of 40/1 was used. The reaction conditions were maintained at 100° C. for 30 minutes and the temperature was then raised to 134° C. for 120 minutes under a nitrogen purge. The grafting efficiency was 36%.

The aromatic polycarbonate (PC) used in this and the following examples was Calibre 302-22 bisphenol-A polycarbonate, available from Dow Chemical. The polycarbonate had a MFR of 22 dg/min measured at 300° C. and 1.2 kg using ASTM method D 1238-82.

The aliphatic polyester used in this and the following examples was P-767 polycaprolactone (PCL), available from Union Carbide. The polyester had a ($M_w$) of 100,000.

Fillers and reinforcing agents, e.g., carbon black and glass fibers, as well as inorganic powders such as calcium carbonate, talc, mica, and glass, can be included in the composition of the invention. In addition to the economic benefit such fillers afford, greater stiffness and a higher heat distortion temperature can be attained.

The compositions of the present invention are prepared by mechanically blending the components in conventional mixing equipment, i.e., a single or twin screw extruder, Banbury mixer, or any other conventional melt compounding equipment. The order in which the components of the composition are mixed is not critical.

The compositions of this invention are useful for molding processes, such as injection molding, and extrusion.

In all of the following examples, all materials were dry blended and bag mixed with Irganox B225 available from Ciba Geigy (a 1:1 blend of Irgafos 168 and Irganox 1010), and calcium stearate as a stabilizer package before extrusion. For examples 1–3 compounding was performed on a twin-screw Berstorff 25 mm extruder at 300 rpm, 475° F., and 25 lb/hr throughput. In Examples 4–14, compounding was performed on a Leitritz 30 mm twin-screw extruder at 475° F., 275 rpm, and 30 lb/hr throughput. The compounded material was then pelletized. Pelletized materials were dried overnight at 150° F. before being injection molded on a 5 oz Battenfeld injection molding machine at 475° F. and a mold temperature of 160° F. The molding cycle consisted of a 20 second injection time, 25 second cooling time, and 2 second mold open time with a maximum injection speed of 0.5 in/sec. In all examples, tensile, flex, and Izod bars were molded simultaneously.

The test methods used to evaluate the molded specimens were ASTM D-256 (Izod impact), ASTM D-638 (tensile strength), ASTM D-790 (flexural modulus), ASTM D-790 (flexural strength at yield), ASTM D-638 (elongation at yield), ASTM D-638 (elongation at break), ASTM D-785 (Rockwell hardness).

In this specification all parts and percentages are by weight unless otherwise noted.

The following examples, presented for illustrative purposes, describe various embodiments of the compositions of the invention.

The amounts of each component of the composition and the results of the physical tests are given in Table 1.

TABLE 1

| SAMPLE | 1 | 2 | 3 | 4 | COMP. 1 | COMP. 2 | COMP. 3 |
| --- | --- | --- | --- | --- | --- | --- | --- |
| PP-g-PSAN (wt. %) | 68.25 | 66.5 | 64.75 | 27 | 100 | 70 | 95 |
| PC (wt. %) | 29.25 | 28.5 | 27.75 | 63 | — | 30 | — |
| PCL (wt. %) | 2.5 | 5 | 7.5 | 10 | — | — | 5 |
| Physical Property @ 23° C. | | | | | | | |
| Notch Izod Impact, ft-lb/in | 1.13 | 0.97 | 0.73 | 0.72 | 0.96 | 1.27 | 0.45 |
| Tensile @ Yield, psi | 6,910 | 7,217 | 7,056 | 6,935 | 5,618 | 6,481 | 5,925 |
| Flex modulus 1% Secant, kpsi | 363 | 370 | 356 | 345 | 316 | 347 | 344 |
| Flex strength @ Yield, psi | 11,830 | 12,090 | 11,513 | 11,100 | 9,862 | 11,380 | 10,200 |
| Elongation @ Yield, % | 12.4 | 12.2 | 11.83 | 11.77 | 10.68 | 12.06 | 9 |
| Elongation @ Break, % | 14.3 | 14.4 | 13.58 | 13.98 | 19.27 | 16.48 | 10.9 |
| Rockwell Hardness, R | 111 | 112 | 113 | 111 | 107 | 107 | 105 |

EXAMPLE 2

This example describes the effect on the properties of compositions that contained a graft copolymer, a polycarbonate, and a polyester, when the amounts of the graft copolymer and the polycarbonate were varied and the amount of polyester remained the same. Comparisons were also made with the physical properties of the composition when no polyester was present and the relative amounts of graft copolymer and polycarbonate were varied (Comparative Examples 4 and 5).

The PP-g-PSAN graft copolymer, polycarbonate, and polyester were the same as those described in Example 1.

The amounts of each component of the composition and the results of the physical tests are given in Table 2.

TABLE 2

| SAMPLE | 1 | COMP. 4 | 2 | COMP. 5 |
| --- | --- | --- | --- | --- |
| PP-g-PSAN (wt. %) | 66.5 | 70 | 57 | 60 |
| PC (wt. %) | 28.5 | 30 | 38 | 40 |
| PCL (wt. %) | 5 | — | 5 | — |
| Physical Property @ 23° C. | | | | |
| Notched Izod Impact, ft-lb/in | 0.97 | 1.27 | 0.97 | 1.2 |
| Tensile @ Yield, psi | 7217 | 6481 | 7569 | 6775 |
| Flex Modulus @ 1% Secant, Kpsi | 370 | 347 | 349 | 351 |
| Flex Strength @ Yield, psi | 12,090 | 11,380 | 12,460 | 11,560 |
| Elongation @ Yield, % | 12.2 | 12.06 | 12.8 | 13.8 |
| Elongation @ Break, % | 14.4 | 16.5 | 15.9 | 26.4 |
| Rockwell Hardness, R | 112 | 107 | 110 | 109 |

EXAMPLE 3

This example describes the effect on the physical properties of a composition that contained a graft copolymer, a polycarbonate, and a polyester when the pph PSAN in the graft copolymer were varied and the amounts of graft copolymer, polycarbonate, polyester, and the styrene/acrylonitrile wt. % ratio remained the same.

The PP-g-PSAN graft copolymer was prepared in the manner described in Example 1, except that the styrene and acrylonitrile were fed at 1.0 pph/min for 30 minutes (Sample 1), and 40 minutes (Sample 2). The total amounts of styrene and acrylonitrile, and the styrene/acrylonitrile weight percent ratios for each sample are given in Table 3. The polycarbonate and polyester were the same as those described in Example 1.

The amounts of each component of the composition and the results of the physical tests are given in Table 3.

TABLE 3

| SAMPLE | 1 | 2 | 3 |
| --- | --- | --- | --- |
| PP-g-PSAN (wt. %) | 66.5 | 66.5 | 66.5 |
| S + AN added (pph) | 30.0 | 40.0 | 50.0 |
| S/AN wt. % Ratio | 75/25 | 75/25 | 75/25 |
| PC (wt. %) | 28.5 | 28.5 | 28.5 |
| PCL (wt. %) | 5 | 5 | 5 |
| Physical Property @ 23° C. | | | |
| Notched Izod Impact, ft-lb/in | 0.4 | 0.95 | 0.97 |
| Tensile @ Yield, psi | 6703 | 6972 | 7217 |
| Flex Modulus @ 1% Secant, Kpsi | 349 | 356 | 370 |
| Flex Strength @ Yield, psi | 11,340 | 11,800 | 12,090 |
| Elongation @ Yield, % | 13.0 | 11.5 | 12.2 |
| Elongation @ Break, % | 21.0 | 16.6 | 14.4 |
| Rockwell Hardness, R | 109 | 110 | 112 |

EXAMPLE 4

This example describes the effect of adding 10 wt. % rubber on the physical properties of a composition that contained a graft copolymer, a polycarbonate, and a polyester. Comparisons were also made with the properties of compositions when no polycarbonate was present (Comparative Example 6), when no polyester was present (Comparative Example 7), and when only the graft copolymer and the polycarbonate were present (Comparative Example 8).

The PP-g-PSAN graft copolymer, the polycarbonate, and the polyester were the same as those described in Example 1. The triblock copolymer (S-EB-S-g-MA) is a succinic anhydride-functionalized styrene/ethylene-butadiene/styrene rubber available from Shell. The copolymer contained 29 wt. % styrene, 71 wt. % ethylene-butadiene rubber midblock, and ~2 wt. % succinic anhydride. In functionalizing this rubber, maleic anhydride reacts through the double bonds, forming succinic anhydride groups.

The amounts of each component of the composition and the results of the physical tests are shown in Table 4.

TABLE 4

| SAMPLE | 1 | COMP. 6 | COMP. 7 | COMP. 8 |
|---|---|---|---|---|
| PP-g-PSAN (wt. %) | 59.96 | 90 | 63 | 70 |
| PC (wt. %) | 25.65 | — | 27 | 30 |
| PCL (wt. %) | 4.5 | — | — | — |
| S-EB-S-g-MA (wt. %) | 10 | 10 | 10 | — |
| Physical Property @ 23° C. | | | | |
| Notched Izod Impact, ft-lb/in | 3.7 | 2.3 | 2.8 | 1.15 |
| Tensile @ Yield, psi | 5,931 | 4704 | 5,408 | 6,557 |
| Flex Modulus @ 1% Secant, Kpsi | 290 | 260 | 255 | 351 |
| Flex Strength @ Yield, psi | 9,856 | 8030 | 9,042 | 11,820 |
| Elongation @ Yield, % | 14.6 | 14.4 | 15.34 | 12 |
| Elongation @ Break, % | 42.2 | 42.0 | 42 | 20 |
| Rockwell Hardness, R | 96 | 96 | 96 | 113 |

EXAMPLE 5

This example describes the effect of adding 10 wt. % of various rubbers on the physical properties of compositions that contained a graft copolymer, a polycarbonate, and a polyester.

The PP-g-PSAN graft copolymer, the polycarbonate, and the polyester were the same as those described in Example 1. The S-EB-S-g-MA is the same rubber as the one used in Example 4. The hydrogenated styrene/ethylene-propylene/styrene (S-EP-S) triblock copolymer, available from Marubeni Specialty Chemicals Inc., contained ~30% styrene end blocks and ~70% isoprene rubbery midblock. The styrene/ethylene-butylene/styrene triblock copolymer (S-EB-S), available from Shell, contained 29 wt. % styrene and 71 wt. % hydrogenated butadiene rubbery midblock.

The amounts of each component of the composition and the results of the physical tests are shown in Table 5.

TABLE 5

| SAMPLE | 1 | 2 | 3 |
|---|---|---|---|
| PP-g-PSAN (wt. %) | 59.96 | 59.96 | 59.96 |
| PC (wt. %) | 25.65 | 25.65 | 25.65 |
| PCL (wt. %) | 4.5 | 4.5 | 4.5 |
| S-EB-S-g-MA (wt. %) | 10 | | |
| S-EP-S (wt. %) | | 10 | |
| S-EB-S (wt. %) | | | 10 |
| Physical Property @ 23° C. | | | |
| Notched Izod Impact, ft-lb/in | 3.7 | 3.54 | 3.3 |
| Tensile @ Yield, psi | 5,931 | 5,889 | 5,748 |
| Flex Modulus @ 1% Secant, Kpsi | 290 | 295 | 282 |
| Flex Strength @ Yield, psi | 9,856 | 9,808 | 9,516 |
| Elongation @ Yield, % | 14.6 | 13.4 | 12 |
| Elongation @ Break, % | 42.2 | 36 | 39.4 |
| Rockwell Hardness, R | 96 | 96 | 95 |

EXAMPLE 6

This example describes the effect of varying the amounts of rubber added on the properties of compositions that contained a graft copolymer, a polycarbonate, a polyester, and a hydrogenated triblock copolymer rubber.

The PP-g-PSAN graft copolymer, the polycarbonate, and the polyester were the same as those described in Example 1. The hydrogenated triblock copolymer rubber (S-EP-S) was the same as the rubber used in Example 5.

The amounts of each component of the composition and the results of the physical tests are shown in Table 6.

TABLE 6

| SAMPLE | 1 | 2 | 3 | 4 |
|---|---|---|---|---|
| PP-g-PSAN (wt. %) | 59.85 | 58 | 56.5 | 53 |
| PC (wt. %) | 25.65 | 25 | 24 | 22.5 |
| PCL (wt. %) | 4.5 | 4.5 | 4.5 | 4.5 |
| S-EP-S (wt. %) | 10 | 12.5 | 15 | 20 |
| Physical Property @ 23° C. | | | | |
| Notched Izod Impact, ft-lb/in | 3.08 | 3.4 | 4.1 | 5 |
| Tensile @ Yield, psi | 5,641 | 5,350 | 5,119 | 4,609 |
| Flex Modulus @ 1% Secant, Kpsi | 297 | 252 | 240 | 211 |
| Flex Strength @ Yield, psi | 9,779 | 8,707 | 8,315 | 7,514 |
| Elongation @ Yield, % | 11.6 | 12.1 | 12.5 | 13 |
| Elongation @ Break, % | 24.4 | 27 | 34.6 | 49.3 |
| Rockwell Hardness, R | 92 | 91 | 86 | 74 |

EXAMPLE 7

This example describes the effect on the physical properties of compositions that contained a graft copolymer, a polycarbonate, and a polyester when the amount of polyester was varied. Comparisons were also made with the properties of compositions that contained no polycarbonate or polyester (Comparative Example 9), no polyester (Comparative Example 10), no polycarbonate and 2.5% polyester (Comparative Example and no polycarbonate and 5% polyester (Comparative Example 12).

The graft copolymer was a copolymer of alpha-methylstyrene, styrene, and maleic anhydride grafted onto a polypropylene backbone (PP-g-P(MS/S/MA). The polypropylene homopolymer used as the backbone polymer was the same as the one used in Example 1. The alpha-methylstyrene copolymer (44/19.4/36.6 alpha-methylstyrene/styrene/maleic anhydride weight ratio, or 40/20/40 molar ratio) was grafted onto the polypropylene backbone at a grafting temperature of 90° C. using the previously described peroxide-initiated graft polymerization process. Fifty parts by weight alpha-methylstyrene copolymer were added per 100 parts polypropylene. 11-Tert-butylperoxy pivalate (1.08 pph active peroxide, 75% in mineral spirits) was used as the peroxide initiator. The alpha-methylstyrene and styrene were premixed and fed at 1.0 pph/min for 50 minutes. Melted maleic anhydride was fed separately at 1.0 pph/min, and peroxide was fed separately at 0.02 pph/min. A monomer to initiator ratio of 100:1 was used. The reaction conditions were maintained at 90° C. for 30 minutes, the temperature was raised to 140° over a period of 15 minutes, and the temperature was raised again to 140° C. under a nitrogen purge for 180 minutes.

The amounts of each component of the composition and the results of the physical tests are shown in Table 7.

TABLE 7

| SAMPLE | 1 | 2 | 3 | 4 | COMP. 9 | COMP. 10 | COMP. 11 | COMP. 12 |
|---|---|---|---|---|---|---|---|---|
| PP-g-P(MS/S/MA) (wt. %) | 68.25 | 66.5 | 64.75 | 63 | 100 | 70 | 97.5 | 95 |
| PC (wt. %) | 29.25 | 28.5 | 27.75 | 27 | — | 30 | — | — |
| PCL (wt. %) | 2.5 | 5 | 7.5 | 10 | — | — | 2.5 | 5 |
| Physical Property @ 23° C. | | | | | | | | |
| Notched Izod Impact, ft.lb/in | 0.45 | 0.45 | 0.45 | 0.45 | 0.75 | 0.48 | 0.736 | 0.80 |
| Tensile @ Yield, psi | 6304 | 6624 | 6683 | 6448 | 5666 | 5942 | 5593 | 5572 |
| Flex Modulus, 1% Secant, Kpsi | 354 | 350 | 352 | 339 | 314 | 334 | 322 | 322 |
| Flex Strength @ Yield, psi | 11,120 | 11,230 | 11,270 | 10,730 | 9,679 | 10,900 | 9616 | 9541 |
| Elongation @ Yield, % | 11.7 | 12.1 | 12.0 | 11.7 | 13.0 | 11.9 | 13.3 | 13.0 |
| Elongation @ Break, % | 12.1 | 13.0 | 13.0 | 13.0 | 22.0 | 13.2 | 27.0 | 22.2 |
| Rockwell Hardness, R | 110 | 113 | 113 | 111 | 108 | 108 | 106 | 106 |

EXAMPLE 8

This example describes the effect of adding 10% by weight of a rubber on the physical properties of compositions that contained a graff copolymer, a polycarbonate, and a polyester. Comparisons were also made with the properties of compositions that contained no polycarbonate or polyester (Comparative Example 13), no polyester (Comparative Example 14), 5% polyester and no rubber (Comparative Example 15), and graff copolymer alone without any additives (Comparative Example 9).

The PP-g-P(MS/S/MA) graff copolymer was prepared as described in Example 7. The polycarbonate and polyester were the same as those described in Example 1. The rubber was the same as the one described in Example 4.

The amounts of each component of the composition and the results of the physical tests are given in Table 8.

the backbone of the graft copolymer had a porosity of 0.44 cc/g. The poly(1,4-butylene adipate) is available from Aldrich and had a $M_w$ of ~12,000. The polyethylene succinate is available from Aldrich. The polyurethane block copolymer with the polycaprolactone soft segment is available as Pellethane 2102-80A from Dow Chemical Co. The polyurethane block copolymer with the polyadipate soft segment is available as Pellethane 2355-75 A from Dow Chemical Co.

The amounts of each component of the composition and the results of the physical tests are given in Table 9.

TABLE 8

| SAMPLE | 1 | COMP. 13 | COMP. 14 | COMP. 15 | COMP. 9 |
|---|---|---|---|---|---|
| PP-g-P/(MS/S/MA) (wt. %) | 59.96 | 90 | 63 | 66.5 | 100 |
| PC (wt. %) | 25.65 | — | 27 | 27.75 | — |
| PCL (wt. %) | 4.5 | — | — | 5 | — |
| S-EB-S-g-MA (wt. %) | 10 | 10 | 10 | — | — |
| Physical Property @ 23° C. | | | | | |
| Notched Izod Impact, ft.lb/in | 2.73 | 1.73 | 1.65 | 0.45 | 0.75 |
| Tensile @ Yield, psi | 5151 | 4649 | 5106 | 6624 | 5666 |
| Flex Modulus, 1% Secant, Kpsi | 248 | 253 | 247 | 350 | 314 |
| Flex Strength @ Yield, psi | 8723 | 7668 | 8506 | 11,230 | 9679 |
| Elongation @ Yield, % | 13.6 | 14.5 | 15.8 | 12.1 | 12.8 |
| Elongation @ Break, % | 26 | 50 | 73 | 13.0 | 21.8 |
| Rockwell Hardness, R | 97 | 95 | 95 | 113 | 108 |

EXAMPLE 9

This example describes the effect of adding 2.5 wt. % of various aliphatic polyesters on the physical properties of compositions that contained a graft copolymer and a polycarbonate.

The PP-g-PSAN graf copolymer, the polycaprolactone, and the polycarbonate are the same as those described in Example 1, except that the propylene homopolymer used as

TABLE 9

| SAMPLE | 1 | 2 | 3 | 4 | 5 |
|---|---|---|---|---|---|
| PP-g-PSAN (wt. %) | 68.25 | 68.25 | 68.25 | 68.25 | 68.25 |
| Polycarbonate (wt. %) | 29.25 | 29.25 | 29.25 | 29.25 | 29.25 |
| Polycaprolactone (wt. %) | 2.5 | — | — | — | — |
| Poly(1,4 butylene adipate) (wt. %) | — | 2.5 | — | — | — |
| Polyethylene succinate (wt. %) | — | — | 2.5 | — | — |
| Polyurethane w/PCL soft segment (wt. %) | — | — | — | 2.5 | — |
| Polyurethane w/polyadipate soft segment (wt. %) | — | — | — | — | 2.5 |
| Physical properties @ 23° C. | | | | | |
| Notched Izod impact, ft-lb/in | 1.13 | 0.65 | 0.81 | 0.67 | 0.74 |
| Tensile strength @ yield, psi | 6,910 | 6,742 | 6,189 | 6,781 | 6,837 |
| Flex modulus, 1% secant, Kpsi | 363 | 359 | 347 | 371 | 365 |
| Flex strength @ yield, psi | 11,830 | 11,610 | 11,080 | 11,680 | 11,640 |
| Elongation @ yield, % | 12.4 | 12 | 11.5 | 11.4 | 11.5 |
| Elongation @ break, % | 14.3 | 20 | 18 | 12.6 | 13.2 |
| Rockwell hardness, R | 111 | 112 | 112 | 111 | 112 |

EXAMPLE 10

This example describes the effect of adding 10% S-EB-S-g-MA rubber on the properties of compositions that contained a graff copolymer, a polycarbonate, and various polyesters.

The PP-g-PSAN graff copolymer, the polycarbonate, and the polyesters are the same as those described in Example 9. The rubber component was the same as the rubber described in Example 4.

The amounts of each component of the composition and the results of the physical tests are shown in Table 10.

TABLE 10

| SAMPLE | 1 | 2 | 3 | 4 | 5 |
|---|---|---|---|---|---|
| PP-g-PSAN | 61.2 | 61.2 | 61.2 | 61.2 | 61.2 |
| Polycarbonate | 26.3 | 26.3 | 26.3 | 26.3 | 26.3 |
| Polycaprolactone | 2.5 | | | | |
| Poly(1,4 butylene adipate) | | 2.5 | | | |
| Polyethylene Succinate | | | 2.5 | | |
| Polyurethane w/PCL Soft Segment | | | | 2.5 | |
| Polyurethane w/polyadipate Soft Segment | | | | | 2.5 |
| S-EB-S-g-MA | 10 | 10 | 10 | 10 | 10 |
| Physical Properties @ 23° C. | | | | | |
| Notched Izod Impact, ft-lb/in | 2.7 | 2.5 | 2.3 | 2.84 | 2.7 |
| Tensile Strength @ Yield, psi | 5,500 | 5,519 | 5,168 | 5,097 | 5,303 |
| Flex Modulus, 1% Secant, Kpsi | 270 | 271 | 252 | 245 | 254 |
| Flex Strength @ Yield, psi | 9,229 | 9,307 | 8,442 | 8,327 | 8,704 |
| Elongation @ Yield, % | 14.5 | 14.2 | 15.6 | 15.6 | 15 |
| Elongation @ Break, % | 44.4 | 40 | 48.4 | 63.6 | 52.3 |
| Rockwell Hardness, R | 95 | 95 | 91 | 91 | 93 |

EXAMPLE 11

This example describes the effect of adding a propylene homopolymer on the physical properties of compositions that comprised a graff copolymer, a polycarbonate, a polyester, and a rubber.

The PP-g-PSAN graff copolymer, the polycarbonate, and the polycaprolactone were the same as those described in Example 9. The rubber was the same as the one described in Example 5. The ungraffed propylene homopolymer was a broad molecular weight distribution homopolymer, spherical form, MFR of 1.1 dg/min, 97.8% insoluble in xylene at room temperature, $M_w/M_n=8.2$.

The amounts of each component of the composition and the results of the physical tests are shown in Table 11.

TABLE 11

| SAMPLE | 1 | 2 | 3 |
|---|---|---|---|
| PP-g-PSAN (wt. %) | 61.2 | 56.5 | 48 |
| Polycarbonate (wt. %) | 26.3 | 24 | 20.5 |
| Polycaprolactone (wt. %) | 2.5 | 2.5 | 2.5 |
| Polypropylene (wt. %) | — | 7 | 19 |
| S-EP-S (wt. %) | 10 | 10 | 10 |
| Physical Properties @ 23° C. | | | |
| Notched Izod Impact, ft-lb/in | 2.72 | 2.73 | 3 |
| Tensile Strength @ Yield, psi | 5,607 | 5,528 | 5,279 |
| Flex Modulus, 1% Secant, Kpsi | 267 | 256 | 256 |
| Flex Strength @ Yield, psi | 9,079 | 8,800 | 8,619 |
| Elongation @ Yield, % | 13.1 | 13.2 | 13.4 |
| Elongation @ Break, % | 43.1 | 47.5 | 45 |
| Rockwell Hardness, R | 95 | 96 | 95 |

EXAMPLE 12

This example describes the effect on the physical properties of compositions that contained a graff copolymer and a polycarbonate when 2.5 wt. % of various polyesters were added.

The PP-g-P(MS/S/MA) graff copolymer was prepared as described in Example 7, except that the propylene homopolymer used as the polymer backbone of the graff copolymer had a porosity of 0.44 cc/g. P(MS/S/MA) is used to designate the alpha-methylstyrene/styrene/maleic anhydride terpolymer that was graffed onto the propylene homopolymer backbone. The polycarbonate and polyesters were the same as those described in Example 9.

The amounts of each component of the composition and the results of the physical tests are given in Table 12.

TABLE 12

| SAMPLE | 1 | 2 | 3 | 4 | 5 |
|---|---|---|---|---|---|
| PP-g-P(MS/S/MA) (wt. %) | 68.25 | 68.25 | 68.25 | 68.25 | 68.25 |
| Polycarbonate (wt. %) | 29.25 | 29.25 | 29.25 | 29.25 | 29.25 |
| Polycaprolactone (wt. %) | 2.5 | — | — | — | — |
| Poly(1,4 butylene adipate) (wt. %) | — | 2.5 | — | — | — |
| Polyethylene succinate (wt. %) | — | — | 2.5 | — | — |
| Polyurethane w/PCL soft segment (wt. %) | — | — | — | 2.5 | — |
| Polyurethane w/polyadipate soft segment (wt. %) | — | — | — | — | 2.5 |
| Physical Properties @ 23° C. | | | | | |
| Notched Izod Impact, ft-lb/in | 0.45 | 0.57 | 0.64 | 0.71 | 0.64 |
| Tensile Strength @ Yield, psi | 6,304 | 6,551 | 6,252 | 6,624 | 6,493 |
| Flex Modulus, 1% Secant, Kpsi | 354 | 359 | 345 | 367 | 358 |
| Flex Strength @ Yield, psi | 11,120 | 11,320 | 10,820 | 11,530 | 11,220 |
| Elongation @ Yield, % | 11.7 | 11.06 | 11.06 | 11.04 | 11.33 |
| Elongation @ Break, % | 12.1 | 14 | 14.33 | 14.25 | 15 |
| Rockwell Hardness, R | 110 | 106 | 105 | 105 | 105 |

EXAMPLE 13

This example describes the effect on the physical properties of a composition that contained a graft copolymer, a polycarbonate, and a rubber when various polyesters were added.

The PP-g-P(MS/S/MA) graff copolymer was prepared as described in Example 12, The polycarbonate and polyesters were the same as those described in Example 9. The rubber was the same as the one described in Example 4.

The amounts of each component of the composition and the results of the physical tests are given in Table 13.

TABLE 13

| SAMPLE | 1 | 2 | 3 | 4 | 5 |
|---|---|---|---|---|---|
| PP-g-P(MS/S/MA) (wt. %) | 61.2 | 61.2 | 61.2 | 61.2 | 61.2 |
| Polycarbonate (wt. %) | 26.3 | 26.3 | 26.3 | 26.3 | 26.3 |
| Polycaprolactone (wt. %) | 2.5 | — | — | — | — |
| Poly(1,4 butylene adipate) (wt. %) | — | 2.5 | — | — | — |
| Polyethylene succinate (wt. %) | — | — | 2.5 | — | — |
| Polyurethane w/PCL soft segment (wt. %) | — | — | — | 2.5 | — |
| Polyurethane w/polyadipate soft segment (wt. %) | — | — | — | — | 2.5 |
| S-EB-S-g-MA (wt. %) | 10 | 10 | 10 | 10 | 10 |
| Physical Properties @ 23° C. | | | | | |
| Notched Izod Impact, ft-lb/in | 2.6 | 3.05 | 3.34 | 2.3 | 1.6 |
| Tensile Strength @ Yield. psi | 5,377 | 5,461 | 5,150 | 5,290 | 5,061 |
| Flex Modulus, 1% Secant, Kpsi | 260 | 267 | 255 | 263 | 247 |
| Flex Strength @ Yield, psi | 8,881 | 9,078 | 8,411 | 8,721 | 8,353 |
| Elongation @ Yield, % | 12.4 | 12.6 | 13.7 | 12.2 | 12.6 |
| Elongation @ Break, % | 46.07 | 42.8 | 59 | 37.8 | 50 |
| Rockwell Hardness, R | 93 | 92 | 90 | 92 | 89 |

EXAMPLE 14

This example describes the effect on the physical properties of a composition that contained a graft copolymer, a polycarbonate, a polyester, and a rubber when varying amounts of an ungrafted propylene polymer material were added to the composition.

The PP-g-P(MS/S/MA) graft copolymer was prepared as described in Example 12. The polycarbonate and polyester were the same as those described in Example 9. The rubber was the same as the one described in Example 4. The propylene homopolymer was the same as the one described in Example 11.

The amounts of each component of the composition and the results of the physical tests are given in Table 14.

TABLE 14

| SAMPLE | 1 | 2 | 3 | 4 |
|---|---|---|---|---|
| PP-g-P(MS/S/MA) (wt. %) | 59.85 | 54.1 | 46.2 | 41 |
| Polycarbonate (wt. %) | 25.65 | 23.2 | 19.8 | 17.5 |
| Polycaprolactone (wt. %) | 4.5 | 4.5 | 4.5 | 4.5 |
| Polypropylene (wt. %) | — | 8.2 | 19.5 | 27 |
| S-EB-S-g-MA (wt. %) | 10 | 10 | 10 | 10 |
| Physical Properties @ 23° C. | | | | |
| Notched Izod Impact, ft-lb/in | 1.2 | 0.91 | 1.1 | 0.95 |
| Tensile Strength @ Yield, psi | 4,326 | 4,337 | 4,262 | 4,311 |
| Flex Modulus, 1% Secant, Kpsi | 246 | 254 | 256 | 258 |
| Flex Strength @ Yield, psi | 7,909 | 7,718 | 7,578 | 7,671 |
| Elongation @ Yield, % | 10 | 9.14 | 9.61 | 10.1 |
| Elongation @ Break, % | 17 | 23 | 21.6 | 25.2 |
| Rockwell Hardness, R | 89 | 91 | 89 | 88 |

We claim:

1. A composition comprising, by weight,
   (a) about 94% to about 30% of a graft copolymer comprising a backbone of a propylene polymer material having graft polymerized thereto monomers that form grafted copolymers or terpolymers, the monomers being selected from the group consisting of (i) styrene and acrylonitrile, wherein the amount of acrylonitrile is about 15% to about 35%, based on the total weight of monomers, and (ii) styrene and maleic anhydride, or alpha-methylstyrene, styrene and maleic anhydride, wherein alpha-methylstyrene comprises 0 to about 45%, styrene comprises about 10% to about 60%, and maleic anhydride comprises about 5% to about 45%, based on the total weight of monomers, and the grained copolymers or terpolymers formed from (i) or (ii) are present in an amount of about 10 to about 95 parts by weight per hundred parts of propylene polymer material,
   (b) about 5% to about 40% of at least one aromatic polycarbonate, and
   (c) about 1% to about 15% of at least one aliphatic polyester having recurring ester structural units of the formula:

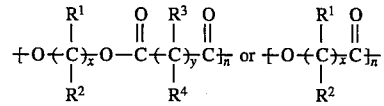

where $R^1$, $R^2$, $R^3$, and $R^4$ are each selected from the group consisting of H, $CH_3$, or a linear or branched alkyl group; x and y are each 1–20 or more, and (a)+(b)+(c)=100%.

2. The composition of claim 1, wherein the propylene polymer material of component (a) is selected from the group consisting of (i) a homopolymer of propylene; (ii) a random copolymer of propylene and an olefin selected from the group consisting of ethylene and $C_4$–$C_{10}$-olefins, provided that, when the olefin is ethylene, the maximum polymerized ethylene content is about 10% by weight, and when the olefin is a $C_4$–$C_{10}$-olefin, the maximum polymerized content thereof is about 20% by weight; and (iii) a random terpolymer of propylene and an olefin selected from the group consisting of ethylene and $C_4$–$C_8$ 1-olefins, provided that the maximum polymerized $C_4$–$C_8$ 1-olefin content is about 20% by weight, and, when ethylene is one of the olefins, the maximum polymerized ethylene content is about 5% by weight.

3. The composition of claim 2, wherein the propylene polymer material is propylene homopolymer.

4. The composition of claim 1, wherein the polycarbonate is a dihydric phenol polycarbonate.

5. The composition of claim 4, wherein the dihydric phenol polycarbonate is a bisphenol-A polycarbonate.

6. The composition of claim 1, wherein the polycarbonate is present in an amount of about 10% to about 30% by weight.

7. The composition of claim 6, wherein the polycarbonate is present in an amount of about 20% to about 30% by weight.

8. The composition of claim 1, wherein the aliphatic polyester is selected from the group consisting of polycaprolactone, polybutylene adipate, polyethylene succinate, poly(2,2-dimethyl-1,3-propylene)succinate, poly(neopentyl glycol sebacate), a block copolymer of a polyurethane and polycaprolactone, and a block copolymer of a polyurethane and polyethylene adipate.

9. The composition of claim 8, wherein the aliphatic polyester is polycaprolactone.

10. The composition of claim 1, wherein the aliphatic polyester is present in an amount of about 2% to about 7% by weight.

11. The composition of claim 1 which additionally comprises (d), about 5% to about 20% by weight of one or more rubber components selected from the group consisting of (i) olefin copolymer rubbers, (ii) monoalkenyl aromatic hydrocarbon-conjugated diene block copolymers, and (iii) core shell rubbers, and (a)+(b)+(c)+(d)=100%.

12. The composition of claim 11, wherein the rubber component is a monoalkenyl aromatic hydrocarbon-conjugated diene block copolymer.

13. The composition of claim 12, wherein the rubber component is a hydrogenated styrene/isoprene block copolymer.

14. The composition of claim 11, wherein the rubber component is present in an amount of about 5% to about 15% by weight.

15. The composition of claim 1 which additionally comprises (e), about 1% to about 50% by weight of a propylene polymer material, and (a)+(b)+(c)+(e)=100%.

16. The composition of claim 11 which additionally comprises (e), about 1% to about 50% by weight of a propylene polymer material, and (a)+(b)+(c)+(d)+(e)=100%.

17. The composition of claim 15, wherein the propylene polymer material is selected from the group consisting of (i) a homopolymer of propylene; (ii) a random copolymer of propylene and an olefin selected from the group consisting of ethylene and $C_4$–$C_{10}$-olefins, provided that, when the olefin is ethylene, the maximum polymerized ethylene content is about 10% by weight, and when the olefin is a $C_4$–$C_{10}$-olefin, the maximum polymerized content thereof is about 20% by weight, (iii) a random terpolymer of propylene and an olefin selected from the group consisting of ethylene and $C_4$–$C_8$ 1-olefins, provided that the maximum polymerized $C_4$–$C_8$ 1-olefin content is about 20% by weight, and, when ethylene is one of the olefins, the maximum polymerized ethylene content is about 5% by weight, and (iv) a homopolymer or random copolymer of propylene that is impact-modified with an ethylene-propylene monomer rubber or an ethylene/propylene/butene monomer rubber either in the reactor or by physical blending, the ethylene-propylene monomer rubber or the ethylene/propylene/butene monomer rubber content of the modified polymer being in the range of about 5% to about 70%, and the ethylene content of the rubber being in the range of about 7% to about 70% by weight.

18. The composition of claim 17, wherein the propylene polymer material is propylene homopolymer.

19. The composition of claim 1 comprising, by weight,
 (a) about 94% to about 45% of a graft copolymer comprising a propylene polymer material having graft polymerized thereto monomers comprising about 80% to about 75% styrene and about 20% to about 25% acrylonitrile, based on the total weight of monomers, the polymerized monomers being present in an amount of about 50 pph to about 95 pph,
 (b) about 5% to about 40% bisphenol-A polycarbonate,
 (c) about 1% to about 15% polycaprolactone, and
 (d) about 5% to about 20% acid- or anhydride-functionalized hydrogenated styrene block copolymer, where (a)+(b)+(c)+(d)=100%.

20. The composition of claim 19 which additionally comprises (e), about 5% to about 40% propylene homopolymer, wherein the graft copolymer (a) is present in an amount of about 30% to about 65% and the polycarbonate (b) is present in an amount of about 10% to about 30%, and (a)+(b)+(c)+(d)+(e)=100%.

21. The composition of claim 1 comprising, by weight,
 (a) about 94% to about 45% of a graft copolymer comprising a propylene polymer material having graft polymerized thereto monomers comprising about 40% alpha-methylstyrene, about 20% styrene, and about 40% maleic anhydride, based on the total weight of monomers, the polymerized monomers being present in an amount of about 50 pph to about 95 pph,
 (b) about 5% to about 40% bis-phenol A polycarbonate,
 (c) about 1% to about 15% polycaprolactone,
 (d) about 5% to about 20% acid- or anhydride-functionalized hydrogenated styrene block copolymer, where (a)+(b)+(c)+(d)=100%.

22. The composition of claim 21 which additionally comprises (e), about 5% to about 40% propylene homopolymer, wherein the graft copolymer (a) is present in an amount of about 30% to about 65% and the polycarbonate (b) is present in an amount of about 10% to about 30%, and (a)+(b)+(c)+(d)+(e)=100%.

* * * * *

UNITED STATES PATENT AND TRADEMARK OFFICE
CERTIFICATE OF CORRECTION

PATENT NO. : 5,585,434
DATED : December 17, 1996
INVENTOR(S) : Anthony J. DeNicola, et al.

It is certified that error appears in the above-indentified patent and that said Letters Patent is hereby corrected as shown below:

At col. 3, line 29, change "pans" to --parts--.

At col. 4, line 47, the words beginning with "oxygen" and ending at col. 5, line 21 after the word "polycarbonates" should have been inserted at col. 4, line 5 after the word "active".

At col. 8, line 25, the words beginning with "Fillers" and ending at col. 8, line 67 after the word "invention" should have been inserted at col. 7, line 52 as the next paragraph.

At col. 12, line 39, after "Example" insert --11),--.

Signed and Sealed this

Thirtieth Day of June, 1998

Attest:

BRUCE LEHMAN

Attesting Officer

Commissioner of Patents and Trademarks